US006730919B2

(12) United States Patent
Shoji et al.

(10) Patent No.: US 6,730,919 B2

(45) Date of Patent: May 4, 2004

(54) RADIATION IMAGE CONVERSION PANEL

(75) Inventors: Takehiko Shoji, Tokyo (JP); Satoshi Honda, Tokyo (JP)

(73) Assignee: Konica Corporation, Tokyo (JP)

(*) Notice: Subject to any disclaimer, the term of this patent is extended or adjusted under 35 U.S.C. 154(b) by 141 days.

(21) Appl. No.: 09/976,639

(22) Filed: Oct. 11, 2001

(65) Prior Publication Data

US 2002/0066868 A1 Jun. 6, 2002

(30) Foreign Application Priority Data

Oct. 18, 2000 (JP) .................................... 2000-317859
Oct. 19, 2000 (JP) .................................... 2000-319327
Oct. 24, 2000 (JP) .................................... 2000-323903

(51) Int. Cl.$^7$ ............................................ G01N 23/04

(52) U.S. Cl. .................................... 250/484.4; 250/581

(58) Field of Search ................................ 250/581, 584, 250/585, 586, 587, 361 R, 370.01, 370.11, 484.4

(56) References Cited

U.S. PATENT DOCUMENTS 4,501,683 A * 2/1985 Arakawa et al. ....... 252/301.26
4,939,018 A * 7/1990 Kohda et al. ............... 428/192
5,877,508 A * 3/1999 Arakawa et al. ............ 250/588

* cited by examiner

*Primary Examiner*—Constantine Hannaher
*Assistant Examiner*—Timothy Moran
(74) *Attorney, Agent, or Firm*—Squire, Sanders & Dempsey L.L.P.

(57) ABSTRACT

A radiation image conversion panel comprising a phosphor sheet having a support and a stimulable phosphor layer provided on the support and a protective film covering the stimulable phosphor layer, wherein a transmittance of the protective film for stimulating light is not larger than 97% and a haze ration of the protective film is within the range of 5% to 60%.

19 Claims, 1 Drawing Sheet

RADIATION IMAGE CONVERSION PANEL

FIELD OF THE INVENTION

The present invention relates to a radiation image conversion panel.

BACKGROUND OF THE INVENTION

Radiation images such as X-ray images are widely employed for medical diagnoses. Utilized as a method for obtaining X-ray images is so-called radiography in which X-rays, which have passed through an object, are subjected to irradiation onto a phosphor layer (being a fluorescent screen) to result in visible light, which is irradiated onto a silver salt bearing film, in the same manner as conventional photography, and the resulting film is subjected to photographic processing. In recent years, however, a method has been invented in which images are formed directly from a phosphor layer without employing silver salt coated films.

Said method is described, for example, in U.S. Pat. No. 3,859,527 and Japanese Patent Publication Open to Public Inspection No. 55-12144.

Specifically, a radiation image conversion panel comprised of stimulable phosphors is utilized, and the stimulable phosphor layer of said radiation image conversion panel is subjected to radiation exposure which has passed through the object being diagnosed so that radiation energy is stored corresponding to the radiation transmittance of each portion of said object. Subsequently, the resulting stimulable phosphor layer is sequentially subjected to stimulation employing electromagnetic waves (stimulating light), such as visible light and infrared rays, so that radiation energy stored in said stimulable phosphor layer is released as stimulated luminescence. Signals of the intensity variation of said stimulated luminescence are subjected, for example, to photoelectric conversion to obtain electrical signals. The resulting electrical signals are employed to reproduce visible images on recording materials such as light-sensitive films or display devices such as a CRT.

Accordingly, compared to radiography in which a combination of conventional radiographic films and intensifying screens is used, it is possible to obtain radiation images with ample information, while utilizing much less radiation exposure.

Said radiation image conversion panel comprises a support having thereon a stimulable phosphor layer or a self-supporting stimulable phosphor layer. Generally, said stimulable phosphor layer is comprised of stimulable phosphors as well as binders which disperse said stimulable phosphors and hold them, or is comprised of only coagulated phosphors formed through a vacuum evaporation method or a sintering method. Further, also known are those in which voids in said coagulated phosphors are impregnated with polymers. Further, generally provided on the surface opposite to the support side of the stimulable phosphor layer is a protective layer film such as a polymer film or an inorganic material vacuum-evaporated film.

The stimulable phosphors employed in said radiation image conversion panel are those which result in stimulated luminescence after having been subjected to irradiation of stimulating light after said radiation. In practice, phosphors are commonly employed which result in stimulated luminescence in the wavelength range of 300 to 500 nm utilizing stimulating light in the wavelength region of 400 to 900 nm.

Herein, examples of stimulable phosphors, which have conventionally been employed in said radiation image conversion panel.

(1) Rare earth element activated alkaline earth metal fluorinated halogen phosphors represented by the composition formula of $(Ba_{l-x}, M(II)_{+x})FX{:}yA$, described in Japanese Patent Publication Open to Public Inspection No. 55-12145, wherein M(II) represents at least one of Mg, Ca, Sr, Zn, and Cd; X represents at least one of Cl, Br, and I; A represents at least one of Eu, Tb, Ce, Tm, Dy, Pr, Ho, Nd, Yb, and Er; "x" and "y" each represent figures satisfying the relationship of $0 \leqq x \leqq 0.6$ and $0 \leqq y \leqq 0.2$, respectively. Further, said phosphors may comprise additives as described (a) through (j).

(a) X', BeX", $M(III)X_3'''$, described in Japanese Patent Publication Open to Public Inspection No. 56-74175, (wherein X', X" and X'" each represent at least one of CL, Br and I; and M(III) represents a trivalent metal);

(b) metal oxides described in Japanese Patent Publication Open to Public Inspection No. 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, and $ThO_2$;

(c) Zr and Sc described in Japanese Patent Publication Open to Public Inspection No. 56-116777;

(d) B described in Japanese Patent Publication Open to Public Inspection No. 57-23673;

(e) As and Si described in Japanese Patent Publication Open to Public Inspection No. 57-23675;

(f) M·L (wherein M represents at least one alkali metal selected from the group of Li, Na, K, Rb, and Cs; L represents at least one trivalent metal selected from the group of Sc, Y, La, Ce, Pr, Nd, Pm, Sm, Gd, Tb, Dy, Ho, Er, Tm, Yb, Lu, Al, Ga, In, and Tl) described in Japanese Patent Publication Open to Public Inspection No. 58-206678;

(g) calcined tetrafluoroboric acid compounds described in Japanese Patent Publication Open to Public Inspection No. 59-27980; calcined, univalent or divalent metal salt of hexafluorosilic acid, hexafluorotitanic acid or hexafluorozirconic acid, described in Japanese Patent Publication Open to Public Inspection No. 59-27289; NaX' (wherein X' represents at least one of Cl, Br and I), described in Japanese Patent Publication Open to Public Inspection No. 59-56479;

(h) transition metals such as V, Cr, Mn, Fe, Co, and Ni, described in Japanese Patent Publication Open to Public Inspection No. 59-56479; M(I)X', M'(II)X", M(III)X'" and A, (wherein M(I) represents at least one alkali metal selected from the group of Li, Na, K, Rb, and Cs; M'(II) represents at least one divalent metal selected from the group of Be and Mg; M(III) represents at least one trivalent metal selected from the group of Al, Ga, In, and Tl; A represents a metal oxide; X', X" and X'" each represents at least one halogen atom selected from the group of F, Cl, Br, and I), described in Japanese Patent Publication Open to Public Inspection No. 59-75200;

(i) M(I)X' (wherein M(I) represents at least one alkali metal selected from the group of Rb or Cs; and X' represents at least one halogen atom selected from the group of F, Cl, Br, and I), described in Japanese Patent Publication Open to Public Inspection No. 60-101173;

(j) $M(II)'X'_2.M(II)'X''_2$, (wherein M(II)' represents at least an alkaline earth metal selected from the group Ba, Sr, or Ca; X' and X" each represents at least one halogen atom selected from the group of Cl, Br, or I, and $X' \neq X''$), described in Japanese Patent Publication Open to Public Inspection No. 61-23679; and $LnX''_3$ (wherein Ln represents at least one rare earth metal selected from the group of Sc, Y, La, Ce, Pr, Nd, Pm, Sm, Gd, Tb, Dy, Ho, Er, Tm, Yb, and Lu; X" represents at least one halogen atom selected from the group of F, Cl, Br, and I), described in Japanese Patent Publication Open to Public Inspection No. 61-264084.

(2) Divalent europium activated alkaline earth metal halide phosphor represented by the composition formula of $M(II)X_2.aM(II)'_2:xEu^{2+}$ (wherein M(II) represents at least one alkaline earth metal selected from the group of Ba, Sr, and Ca; X and X' each represent at least one halogen atom selected from the group of Cl, Br, and I; and X≠X'; "a" represents a figure satisfying the relationship of $0 \leqq a \leqq 0.1$ and "x" represents a figure satisfying the relationship and $0 \leqq x \leqq 0.2$), described in Japanese Patent Publication Open to Public Inspection No. 60-84381. Further, said phosphors may comprise additives as described in (a) through (e) below.

(a) $M^{I}X'$ (wherein $M^{I}$ represents at least one alkali metal selected from the group of Rb and Cs; X' represents at least one halogen atom selected from the group of F, Cl, Br, and I), described in Japanese Patent Publication Open to Public Inspection No. 60-166379;

(b) KX", $MgX_2'''$ and $M(III)X_3''''$ (wherein M(III) is at least one trivalent metal selected from the group of Sc, Y, La, Gd, and Lu; X", X''' and X'''' each represent at least one halogen atom selected from the group of F, Cl, Br, and I), described in Japanese Patent Publication Open to Public Inspection No. 221483;

(c) B described in Japanese Patent Publication Open to Public Inspection No. 60-228592; oxides such as $SiO_2$ or $P_2O_5$, described in Japanese Patent Publication Open to Public Inspection No. 60-228593; LiX" and NaX" (wherein X" represents at least one halogen atom selected from the group of F, Cl, Br, and I), described in Japanese Patent Publication Open to Public Inspection No.61-120882;

(d) SiO described in Japanese Patent Publication Open to Public Inspection No. 61-120883; $SnX_2''$ (wherein X" is at least one halogen atom selected from the group of F, Cl, Br, and I), described in Japanese Patent Publication Open to Public Inspection No. 61-120885;

(e) CsX" and $SnX_2'''$ (wherein X" and X''' each represent at least one halogen atom selected from the group of F, Cl, Br, and I), described in Japanese Patent Publication Open to Public Inspection No. 61-235486; and CsX" and $Ln^{3+}$ (wherein X" represents at least one halogen atom selected from the group of F, Cl, Br, and I; Ln represents at least one rare earth element selected from the group of Sc, Y, Ce, Pr, Nd, Sm, Gd, Tb, Dy, Ho, Er, Tm, Yb, and Lu), described in Japanese Patent Publication Open to Public Inspection No. 61-235487.

(3) Rare earth element activated rare earth oxyhalide phosphors represented by the composition formula of LnOX:xA, (wherein Ln represents at least one of La, Y, Gd, and Lu; X represents at least one of Cl, Br, and I; A represents at least one of Ce and Tb; and "x" represents a figure satisfying the relationship of $0<x<0.1$), described in Japanese Patent Publication Open to Public Inspection No. 55-12144;

(4) Cerium activated trivalent metal oxyhalide phosphors represented by the composition formula of M(II)OX:xCe, (wherein M(II) represents at least one oxidized metal selected from the group of Pr, Nd, Pm, Sm, Eu, Tb, Dy, Ho, Er, Tm, Yb, and Bi; X represents at least one of Cl, Br, and I; "x" represent a figure satisfying the relationship of $0<x<0.1$), described in Japanese Patent Publication Open to Public Inspection No. 58-69281;

(5) Bismuth activated alkali metal halide phosphors represented by the composition formula of M(I)X:xBi, (wherein M(I) represents at least one alkali metal selected from the group of Rb and Cs; X represents at least one halogen atom selected from the group of Cl, Br, and I; "x" represent a figure satisfying the relationship of $0<x \leqq 0.2$), described in Japanese Patent Application No. 60-70484;

(6) Divalent europium activated alkaline earth metal halophosphate phosphors represented by the composition formula of $M(II)_5(PO_4)_3X:Eu^{2+}$, (wherein M(II) represents at least one alkaline earth metal selected from the group of Ca, Sr, and Ba; X represents at least one halogen atom selected from the group of F, Cl, Br, and I; and "x" represents a figure satisfying the relationship of $0<x \leqq 0.2$), described in Japanese Patent Publication Open to Public Inspection No. 60-141783;

(7) Divalent europium activated alkaline earth metal haloborate phosphors represented by the composition formula of $M(II)_2BO_3X:xEu^{2+}$ (wherein M(II) represents at least one alkaline earth metal selected from the group of Ca, Sr, and Ba; X is at least one halogen atom selected from the group of Cl, Br, and I; and "x" is a figure satisfying the relationship of $0<x \leqq 0.2$), described in Japanese Patent Publication Open to Public Inspection No. 60 157099;

(8) Divalent europium activated alkaline earth metal halophosphate phosphors represented by the composition formula of $M(II)_2PO_4X:xEu^{2+}$, (in which M(II) represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-157100;

(9) Divalent europium activated alkaline earth metal hydrogenated halide phosphors represented by the composition formula of $M(II)HX:xEu^2$ (wherein M(II) represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-217354;

(10) Cerium activated rare earth composite halide phosphors represented by the composition formula of $LnX_3.aLn'X_3':xCe^{3+}$, (wherein Ln and Ln' each represent at least one rare earth element selected from the group of Y, La, Gd, and Lu; X and X' each represents at least one halogen atom selected from the group of F, Cl, Br, and I; X≠X'; "a" represents a figure satisfying the relationship of $0<a \leqq 10.0$; and "x" represents a figure satisfying the relationship of $0<x \leqq 0.2$), as described in Japanese Patent Publication Open to Public Inspection No. 61-21173;

(11) Cerium activated rare earth composite halide phosphors represented by the composition formula of $LnX_3.aM(I)X':xCe^{3+}$ (wherein Ln represents at least one rare earth element selected from the group of Y, La, Gd, and Lu; M(I) represents at least one alkali metal selected from the group of Li, Na, K, Cs, and Rb; X and X' each represents at least one halogen atom selected from the group of Cl, Br, and I; "a" represents a figure satisfying the relationship of $0<a \leqq 10.0$; and "x" represents a figure satisfying the relationship of $0<x \leqq 0.2$), described in JP-A 61-21182;

(12) Cerium activated rare earth halophosphate phosphors represented by the composition formula of $LnPO_4.aLnX_3:xCe^{3+}$ (wherein Ln represents at least one rare earth element selected from the group of Y, La, Gd, and Lu; X represents at least one halogen atom selected from the group of F, Cl, Br, and I; "a" represents a figure satisfying the relationship of $0<a \leqq 10.0$; and "x" represents a figure satisfying the relationship of $0<x\leqq 0.2$), described in Japanese Patent Publication Open to Public Inspection No. 61-40390;

(13) Divalent europium activated cesium rubidium halide phosphors represented by the composition formula of CsX:aRbX':xEu$^{2}$ (wherein X and X' each represents at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236888;

(14) Divalent europium activated composite halide phosphors represented by the formula of $M(II)X_2.aM^{I}X':xEu^{2+}$ (wherein M(II) represents at least one alkaline earth metal selected from the group of Ba, Sr, and Ca; $M^I$ represents at least one alkali metal selected from the group of Li, Rb, and Cs; X and X' each represent at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236890.

Of said stimulable phosphors, iodide-containing divalent europium activated alkaline earth metal fluorohalide phosphors, iodide-containing divalent europium activated alkaline earth metal halide phosphors, iodide-containing rare earth element activated rare earth oxyhalide phosphors, and iodide-containing bismuth activated alkaline metal halide phosphors are preferable since the materials result in high stimulated luminescence.

The radiation image conversion panel, employing said stimulable phosphors, stores radiation image information and releases stored energy through stimulating light scanning. Therefore, after scanning, it is possible to repeatedly store radiation images so as to be capable of being repeatedly used. Further, contrary to the fact that in the conventional radiography, radiographic film is consumed for every exposure, said radiation image conversion method is more advantageous from the viewpoint of resource conservation as well as economic efficiency, because it is possible to repeatedly utilize said radiation image conversion panel.

In a method employing such stimulable phosphors, it is preferable to achieve durable performance over a long period of time without deteriorating the image quality of radiation images obtained utilizing said radiation image conversion panel.

However, stimulable phosphors, employed to produce said radiation image conversion panel, commonly are very hygroscopic. As a result, when set aside in a room under normal weather conditions, deterioration proceeds markedly over an elapse of time.

Specifically, for instance, when a stimulable phosphor layer is set aside in a high humidity atmosphere, the radiation sensitivity of said stimulable phosphor decreases along with an increase in absorbed moisture. Further, latent images recorded onto said stimulable phosphor layer generally fade along with an elapse of time after radiation exposure. As a result, as the time from radiation exposure to scanning, increases utilizing stimulating light, radiation image signals decrease. Accordingly, when said stimulable phosphor layer absorbs moisture, the rate of image fade increases, whereby reproducibility of regenerative signals is degraded during reading of radiation images.

Therefore, in order to minimize degradation of said stimulable phosphor layer due to moisture absorption, a method is employed in which said stimulable phosphor layer is covered with a moisture resistant protective layer with low moisture permeability so that moisture reaching said stimulable phosphor layer decreases. Employed as said moisture resistant protective layers are a polyethylene terephthalate (PET) film and a metalized film in which a thin layer comprised of metal oxides and silicone nitride is formed through vacuum evaporation.

Known as methods for preparing low moisture permeable protective films are those in which glass plates or high-barrier thick resinous films are employed, and laminated films are employed which are prepared by laminating 2 to 8 films vacuum-evaporated with a thin glass layer comprised of metal oxides and silicon nitride. However, when said methods are employed, problems occur in which the sharpness of the resulting radiation images is degraded due to an increase in thickness of the protective film itself. In order to overcome said problems, Japanese Patent Publication Open to Public Inspection No. 1-131499 proposes that a low refractive index layer, comprised of air, is provided between the protective film and the phosphor layer. Further, Japanese Patent Publication Open to Public Inspection No. 11-249243 describes an embodiment in which a resinous film is employed as the protective film.

Said Japanese Patent Publication Open to Public Inspection No. 11-249243 describes a method for securing the low refractive index layer when a resinous film is employed as the protective layer. However, the practiced constitution of said low refractive index layer is neither illustrated nor suggested.

When said radiation image conversion panel is employed, a laser beam with a high beam convergence is commonly employed as the light source of the stimulating light of a stimulable phosphor plate. Therefore, when scanning is carried out employing a laser beam via the protective layer comprised of a polymer film such as PET, there occur scattering of the stimulating laser beam in the interior of said protective film, and the diffused reflection of the stimulating laser beam between said protective layer and the beam detection device, and in peripheral members. As a result, the stimulable phosphor surface away from the location, wherein the stimulating light is scanned, is subjected to excitation, whereby stimulated luminescence is generated, and as a result, sharpness is degraded. Further, in the case in which said protective layer is not formed on the phosphor plate, problems have occurred in which high sharpness is not obtained due to the diffused reflection of the stimulating laser beam between the phosphor plate surface and the beam detection device, as well as in peripheral members.

Specifically, stretched films, such as polyethylene terephthalate film and polyethylene naphthalate film, exhibit excellent physical properties as the protective layer from the aspect of transparency, barrier properties, and strength. On the other hand, due to their high refractive index, some of the stimulating light incident into the interior of the protective film is repeatedly reflected at the upper and lower surfaces of the film. As a result, stimulated luminescence is generated at positions away from the scanned position due to propagation of said stimulating light, whereby sharpness is degraded.

Furthermore, the stimulating light reflected in the direction opposite the phosphor surface in the upper and lower surfaces of the protective layer is also repeatedly reflected between light detection devices as well as in peripheral members, whereby the stimulable phosphor layer farther away from the scanned position is stimulated to generate stimulated luminescence. As a result, sharpness is further degraded. Said stimulating light is a coherent light of relatively long wavelengths, from red to infrared. Therefore, as long as scattered light as well as reflection light is not sufficiently absorbed, the amount of light absorbed by the interior of the protective film and the space of the interior of the reading device decreases.

Thus, said stimulating light is propagated to relatively distant positions, resulting in the degradation of sharpness. Further, when said polyethylene terephthalate film as well as said polyethylene naphthalate film is employed as the protective layer, problems also occur resulting in unevenness, except for the radiation images of the objects, that is, image unevenness and linear noise which is assumed to have been formed during the production of the protective layer. Japanese Patent Publication Open to Public Inspection No. 59-42500 and Japanese Patent Publication 1-57759 disclose means to minimize said image unevenness as well as said linear noise by increasing the haze ratio of the protective layer. However, when the haze ratio is increased, problems occur in which sharpness is degraded.

Further, in order to minimize such sharpness degradation, it is noted that the thickness of the protective film is preferably decreased to shorten the propagation distance of the stimulating light in the interior of the protective film. However, this method results in small desired effects and by contrast, problems occur in which moisture resistance as well as abrasion resistance is degraded due to a decrease in the thickness of the protective layer. Further, regarding improvement of sharpness, Japanese Patent Publication No. 59-23400 discloses a method in which any of the support, the sublayer, the phosphor layer, the interlayer, and the protective layer of a radiation image conversion panel is tinted with color absorbing stimulating light, while Japanese Patent Publication Open to Public Inspection No. 60-200200 discloses a method in which the adhesive agent layer between the phosphor layer and the protective layer is tinted. However, when the sharpness is enhanced employing said methods, problems occur in which said image unevenness as well as said linear noise is more pronounced.

When said sharpness decreases or said image unevenness as well as said linear noise is pronounced, the radiation image conversion panel, which is utilized for medical diagnoses, results in critical drawbacks.

Accordingly, there has been a demand to solve the problems previously described.

An object of the present invention is to provide a radiation image conversion panel employing a stimulable phosphor, which results in no image unevenness and exhibits excellent sharpness.

SUMMARY OF THE INVENTION

Said object of the present invention has been achieved employing items described below.

Structure 1

A radiation image conversion panel comprising a phosphor sheet having a support and a stimulable phosphor layer provided on the support and a protective film covering the stimulable phosphor layer, wherein a transmittance of the protective film for stimulating light to stimulate the stimulable phosphor layer is not larger than 97% and a haze ratio of the protective film is within the range of 5% to 60%.

Structure 2

The radiation image conversion panel of Structure 1, wherein the transmittance of the protective film for stimulating light is within a range of from 97 to 50 percent.

Structure 3

The radiation image conversion panel of Structure 2, wherein the transmittance of the protective film for stimulating light is within a range of from 95 to 80 percent.

Structure 4

The radiation image conversion panel of Structure 1, wherein the haze ratio is within the range of 5% to 50%.

Structure 5

The radiation image conversion panel of Structure 4, wherein the haze ratio is within the range of 10% to 30%.

Structure 6

The radiation image conversion panel of Structure 1, wherein a water vapor transmission rate of the protective film is not more than 50 $g/m^2$ per day.

Structure 7

The radiation image conversion panel of Structure 6, wherein the water vapor transmission rate of the protective film is not more than 10 $g/m^2$ per day.

Structure 8

The radiation image conversion panel of Structure 1, wherein the protective film comprises a stimulating light absorbing layer.

Structure 9

The radiation image conversion panel of Structure 8, wherein the protective film further comprises a first resin layer and a second resin layer and the stimulating light absorbing layer is provided between the first resin layer and the second resin layer.

Structure 10

The radiation image conversion panel of Structure 1, wherein the protective film comprises a thermo-welding resin on a surface, which is in contact with the phosphor sheet.

Structure 11

The radiation image conversion panel of Structure 1, wherein the protective film is provided independently from the stimulable phosphor layer so as to cover the whole surface of the phosphor sheet and the protective film has an outermost layer, which is in contact with the phosphor sheet, and a surface roughness of the outermost layer of the protective film is larger than a surface roughness of the stimulable phosphor layer, wherein the surface roughness is arithmetical mean roughness (Ra) defined by JIS-B0601.

Structure 12

The radiation image conversion panel of Structure 12, wherein the surface roughness of the outermost layer of the protective film is not more than 1.0 $\mu$m.

Structure 13

The radiation image conversion panel of Structure 11, wherein a water vapor transmission rate of the protective film is not more than 50 $g/m^2$ per day.

Structure 14

The radiation image conversion panel of Structure 13, wherein the water vapor transmission rate of the protective film is not more than 10 $g/m^2$ per day.

Structure 15

The radiation image conversion panel of Structure 11, wherein the outermost layer of the protective film comprises a thermo-welding resins on surface, which is in contact with the phosphor sheet.

Structure 16

The radiation image conversion panel of Structure 1, wherein the protective film covers a whole surface of the phosphor sheet.

BRIEF DESCRIPTION OF THE DRAWINGS

In FIG. 1, Symbol 1 represents a radiation image conversion panel. Symbols 11 and 12 represent a stimulable phosphor layer and a support, respectively, and Each of Symbols 13 and 14 represents a protective film.

DETAILED DESCRIPTION OF THE INVENTION

Figure 1:
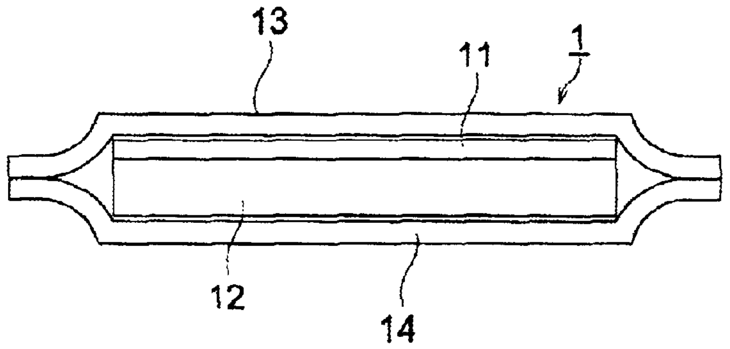
FIG. 1 is a cross-sectional view showing one example of the radiation image conversion panel of the present invention, having a structure in which the upper and lower edges of the protective films are welded.

The present invention will now be detailed.

In a radiation image conversion panel which comprises a support having thereon a phosphor sheet comprising a stimulable phosphor layer and also a protective film provided so as to cover said stimulable phosphor layer, problems such as degradation of sharpness due to a stimulating laser beam, image unevenness, and linear noise, are solved by adjusting the transmittance of said protective film for stimulating light to not more than 97 percent, as well as by adjusting the haze ratio of said protective film to from 5 to 60 percent. As a result, in the present invention, it has become possible to provide a radiation image conversion panel capable of being used in an excellent state over a long period of time.

Further, penetration of moisture into said phosphor sheet, comprised of said stimulable phosphor layer, is prevented and minimized as follows. A water resistant protective film is provided on both sides of said phosphor sheet and the upper and lower protective films which are located beyond said phosphor sheet are welded or adhered utilizing an adhesive to form a sealed structure, whereby it is possible to seal moisture from the exterior. However, problems have occasionally occurred in which the sharpness of radiation images locally differs due to the state of the air layer between the phosphor surface and said protective film.

The inventors of the present invention diligently conducted investigations to solve such problems. As a result, it was discovered that by adjusting the surface roughness defined by JIS-B0610 as Arithmetical mean roughness (Ra) of the outermost layer of said protective film to be greater than that of said stimulable phosphor layer, it was possible to obtain radiation images having higher sharpness. JIS-B0610 is corresponding to English references, ISO 468-1982, ISO 3274-1975, ISO 4287/1-1984, ISO 4287/2-1984 and ISO 4288-1985. The Arithmetical mean roughness (Ra) is a parameter representing an averaged value of surface roughness caused by protrusions (or peaks and valleys) on the surface. The higher this value, the larger the average roughness.

Alternatively, the Arithmetical mean roughness (Ra), when the roughness curve has been expressed by y=f(x), is a value, expressed in micrometer ($\mu$m), that is obtained from the following formula, extracting a part of reference length L in the direction of its center-line from the roughness curve, and taking the center-line of this extracted part as X-axis and the direction vertical magnification as Y-axis:

$$Ra = \frac{1}{L}\int_0^L |f(x)|dx$$

The Arithmetical mean roughness (Ra) can be determined, for example, in such a manner that measuring samples are allowed to stand in an atmosphere of 25° C. and 65% RH for 24 hrs. and then measured under the same atmosphere. As a measurement apparatus is cited, for example, RST/PLUS non-contact type three-dimensional micro surface shape measuring system, available from WYKO Co.

When the surface roughness of the outermost layer on the phosphor surface side of the moisture resistant film and the surface roughness of the phosphor are adjusted to satisfy a certain specified relationship, the effects described in the present invention are obtained. The inventors of the present invention assume the reasons for the resulting fact as follows.

As described in publications conventionally known in the art, such as Japanese Patent Publication Open to Public Inspection No. 1-131499, when a phosphor surface comes into close contact with a protective layer, sharpness is degraded as the thickness of said protective layer increases. This is caused as follows. A stimulating light incident to stimulable phosphor surface is reflected and scattered, and the resulting light is reflected on the interface between the protective layer and the air layer and is again incident to said stimulable phosphor surface, whereby sharpness is degraded. As the thickness of said protective layer increases, the resulting reflected light further reaches remote location, whereby the sharpness results in degradation.

Compared to constitutions, conventionally known in the art, a low refractive index layer, comprised of air, is present between the stimulable phosphor layer and the protective film which have different surface roughness with each other. Due to the presence of said low refractive index layer, comprised of air, some of light, which has been reflected and scattered on said stimulable phosphor surface, is incident to the interior of said protective layer and the other is reflected on the interface between said low refractive index layer and said protective layer and is again incident to the phosphor surface. Of said scattered reflected light, the reflected light incident to the interior of said protective layer is not again reflected on the interface between said protective layer and said air layer, and released to the exterior. As a result, compared to constitutions, conventionally known in the art, degradation of the sharpness is minimized.

By adjusting the surface roughness (Ra) of said protective film to the range of 0.2 to 1.0 $\mu$m, it is possible to further improve sharpness due to rapid attenuation of the scattered reflected light component which has been reflected on the interface between said low refractive index layer and the said protective layer and has again been incident to the phosphor surface.

Further, as the thickness of said low refractive index layer (being said air layer) decreases, sharpness is further improved. By contrast, when said protective layer comes into contact with the phosphor surface, sharpness is degraded. When the surface on the side in contact with the phosphor of said protective layer is smoothened, the thickness of said low refractive index layer (being said air layer) decreases. On the other hand, areas in contact with the phosphor surface increase and some specified areas may come into perfect contact, resulting in sharpness unevenness within the plate surface.

As noted above, in the sealed structure of the stimulable phosphor, in which the protective film of the present invention is utilized, in order that optimal sharpness is exhibited, it is preferable for the sealed structure to be in a specific contact state. Structure 11, which is one embodiment of the present invention, realizes said optimal contact state.

The protective film according to the present invention will now be described.

Specifically employed as materials for preparing the protective film according to the present invention may be polyester film, polymethacrylate film, nitrocellulose film, and cellulose acetate film. Of these, stretched films such as polyethylene naphthalate film and polyethylene naphthalate film are preferred in terms of transparency as well as strength, and of these, polyethylene terephthalate film is preferably employed.

The stimulating light absorptive function of the protective film according to the present invention will now be described.

From the viewpoint of minimizing sharpness degradation due to a stimulating laser beam, it is preferable that the protective film of the present invention is provided with a stimulating light absorptive function. “Having a stimulating light absorptive function”, as described herein, refers to the function which absorbs light capable of stimulating stimulable phosphors and is defined as the function which results in a light transmittance of no more than 97 percent with respect to the stimulating light. In order to provide the stimulating light absorptive function, it is possible to provide a stimulating light absorbing layer in the protective film. Said stimulating light absorbing layer, as described herein, refers to the layer which absorbs the stimulating light capable of stimulating stimulable phosphors. It is preferable that a layer is coated, which comprises colorants selectively absorbing said stimulating light. In the present invention, said stimulating light absorbing layer may be applied onto one or both surfaces of said protective film. Further, said protective film itself may be tinted with such colorants.

The type of employed colorants is determined depending on the type of stimulable phosphors employed in the radiation image conversion panel. Employed as stimulable phosphors for the radiation image conversion panel are, for example, phosphors which result in stimulated luminescence in the wavelength range of 300 to 500 nm, utilizing stimulating light in the wavelength region of 400 to 900 nm. Accordingly, employed as colorants are the blue to green organic or inorganic colorants described below.

Listed as examples of said blue to green organic colorants are Zapon First Blue 3G (manufactured by Hoechst AG), Estrol Brill Blue N-3RL (manufactured by Sumitomo Kagaku Co., Ltd.), Sumiacryl Blue F-GSL (Sumitomo Kagaku Co., Ltd.), D & C Blue No. 1 (manufactured by National Aniline AG), Spirit Blue (manufactured by Hodogaya Kagaku Co., Ltd.), Oil Blue No. 603 (manufactured by Orient Co., Ltd.), Kiton Blue A (manufactured by Ciba-Geigy Co.), Aizen Cathilon Blue GLH (manufactured by Hodogaya Kagaku Co., Ltd.), Lake Blue A, F, H (Kyowa Sangyo Co., Ltd.), Rodarin Blue 6GX (Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (Toyo Ink Co., Ltd.), and Lionol Blue SL (manufactured by Toyo Ink Co., Ltd.). Further, listed as examples of blue to green inorganic colorants are ultramarine blue, cobalt blue, cerulean blue, chrome oxide, and $TiO_2$—ZnO—CoO—NiO based pigments. However, the present invention is not limited to these examples, but copper phthalocyanine is preferably listed.

In the protective film according to the present invention, from the viewpoint of allowing the effects described in the present invention to be exhibited, and particularly of maintaining high luminance of the radiation image conversion panel, the light transmittance at the wavelengths of stimulating light is preferably from 97 to 50 percent, and is more preferably from 95 to 80 percent. The light transmittance, as described herein, means that when the light transmittance of the protective film having no stimulating light absorbing function is set at 100 percent, the light transmittance of the protective film having the stimulating light absorbing function is adjusted to result in 50 to 97 percent.

In the present invention, the light transmittance of the protective film provided on the support surface opposite the stimulable phosphor layer side of the phosphor sheet is preferably from 0 to 97 percent. Further, in the present invention, it is more preferable that the stimulating light absorptive function of the protective film provided on the support surface opposite the stimulable phosphor layer side of the phosphor sheet is greater than that of the protective film provided on said stimulable phosphor layer side.

Said light transmittance is obtained based on the formula described below:

light transmittance (in percent)=(transmitted light/incident light)×100

The haze ratio of the protective film according to the present invention will now be described.

From the viewpoint of realizing the effects described in the present invention, particularly, improving sharpness and minimizing image unevenness as well as linear noise, it is necessary to adjust the haze ratio of the protective film to from 5 to 60 percent. Said haze ratio is adjusted more preferably to from 5 to 50 percent, and still more preferably to from 10 to 30 percent.

Said haze ratio of the protective film is determined employing the method specified in ASTMD-1003.

It is possible to adjust the haze ratio of the protective film according to the present invention with reference to the haze ratio of the employed resinous film. Further, resinous films having an optional haze ratio are commercially available.

In the present invention, from the viewpoint of minimizing degradation of stimulable phosphors due to moisture absorption, it is preferable that the protective film according to the present invention is made moisture resistant. Specifically, the water vapor transmission rate of said protective film is preferably no more than 50 $g/m^2$.day, is more preferably no more than 10 $g/m^2$.day, and is most preferably no more than 1 $g/m^2$.day.

It is possible to determine the water vapor transmission rate of protective films with reference to the method specified in JIS Z 0208. In the reference, the water vapor transmission rate is defined as follow.

“The water vapour transmission rate is the quantity of vapour passing through the unit area of filmy substance for the definite hour. In this standard, when constituting the boundary surface by the moisture-proof packaging materials at the temperature of 20° C. or 40° C., and keeping the air of one side at a relative humidity of 90% and the air of the other side at the dry state by moisture absorbent, the value having converted the mass (g) passing through this boundary surface for 24 h into the value per 1 m2 shall be defined as the water vabour transmission rate."

Further, from the viewpoint of effectively minimizing degradation of stimulable phosphors due to moisture absorption, it is preferable that the entire surface is covered employing protective films. In that case, as illustrated in FIG. 2, it is preferable that both surfaces (the surface having the stimulable phosphor layer and the support surface opposite the stimulable phosphor layer side of the phosphor sheet) are covered with at least one folded-back protective layer.

Figure 2:
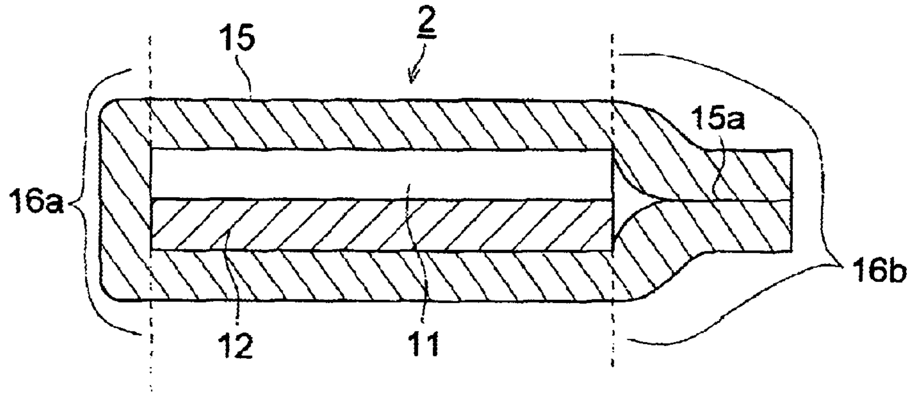
FIG. 2 is a cross-sectional view showing one example of the radiation image conversion panel of the present invention, having a structure in which the protective film is folded-back.

In FIG. 2, a sheet of protective film 15 is doubled onto itself, and thereafter, two sides (not shown) are subjected to heat/pressure adhesion or heat fusion. Subsequently, after covering the entire surface of support 12 and phosphor 11 formed on said support 12, one remaining side 15*a* is subjected to heat/pressure adhesion or heat fusion. Thus, FIG. 2 shows radiation image conversion panel 2 in which phosphor 11 is enclosed in sealed protective film 15 on three sides.

Further, "the folded-back parts of the protective film", as described herein, refers to the parts covering both of the sides of phosphor sheet 11 and the sides of support 12 as shown as folding parts 16*a* and 16*b* in FIG. 2.

From the viewpoint of enhancing the moisture resistance of said protective film by adjusting the water vapor transmission rate to said range, it is preferable to employ vacuum-evaporated films prepared by vacuum-evaporating a thin layer comprised of metal oxides and silicon nitride onto a polyethylene terephthalate film or an ethylene terephthalate film.

Further, in order to achieve the desired moisture resistance needed for the protective film of the present invention, it is possible to provide optimal moisture resistance by laminating said protective film with a plurality of films such as resinous films or metalized films which have been subjected to vacuum evaporation employing metal oxides. As the laminating methods, it is possible to employ those conventionally known in the art.

In the present invention, said stimulating light absorbing layer may be provided between said laminated film sheets. As a result, said stimulating light absorbing layer is protected from physical impact as well as chemical modification, whereby it is possible to maintain constant plate performance over a long period of time.

Accordingly, said stimulating light absorbing layer may be provided between the laminated resinous films at a plurality of locations. Further, an adhesive agent layer, employed for lamination, may comprise colorants and may be employed as the stimulating light absorbing layer.

When a phosphor plate is sealed employing the protective film according to the present invention, any methods conventionally known in the art may be applied. When the outermost layer of said protective film, which comes into contact with the phosphor sheet, comprises thermo-welding resins, it becomes possible to weld said protective films to each other. As a result, it is possible to enhance the efficiency of sealing at the peripheral edges of the phosphor sheets and to effectively minimize degradation of characteristics due to moisture absorption.

It is preferable that said protective film be provided on both sides of the phosphor sheet, and the peripheral edges of both protective films, which are at the exterior of the periphery of the phosphor sheet, are welded so as to form a sealed structure. By employing said structure, it is possible to prevent moisture entrance at the periphery of the phosphor sheet. It is more preferable that said protective film possesses a layer comprising said thermo-welding resins in the area employed only for said sealing.

Further, by employing a moisture resistant protective film (refer to FIG. 1) which is prepared by laminating at least one aluminum film onto the surface of the support side, it is possible to more assuredly minimize the entrance of moisture. This sealing method is easily affected. Further, in this case, it is preferable that the thermo-welding resinous layer as the outermost layer of the protective film on the side in contact with the stimulable phosphor layer is basically not adhered to the phosphor surface.

In the present invention, "a protective film is provided independently from a stimulable phosphor layer" refers to the state in which said protective film is neither applied onto nor adhered to said stimulable phosphor layer, and said protective film and said stimulable phosphor layer are not optically integrated. In said sealing structure, it is assumed that said stimulable phosphor layer and said moisture resistant layer are microscopically brought into contact at various points. However, when the total contact area is no more than 10 percent of the phosphor area, it is defined that said stimulable phosphor layer and said protective film are not optically matched.

The thermo-welding film, as described herein, refers to a resinous film capable of being welded, employing a commonly used impulse sealer, and includes, for example, ethylene-vinyl acetate copolymer film (EVA), polypropylene (PP) film, and polyethylene film (PE). However, the present invention is not limited to these examples.

Various types of polymer materials are employed as support. From the viewpoint of handling information recording materials, flexible sheets or those capable of being machined into a web are suitable. From this viewpoint, preferred are plastic films such as cellulose acetate film, polyester film, polyethylene terephthalate film, polyethylene naphthalate film, polyamide film, polyimide film, triacetate film, and polycarbonate film.

Further, from the viewpoint of preparing images with excellent sharpness as well as high contrast, it is preferable that the support according to the present invention exhibits said stimulating light absorptive function. As a means to provide said stimulating light absorptive function to said support, it is preferable that colorants, previously described, be incorporated into said support, or a colorant containing layer is applied onto said support.

Incidentally, though the thickness of these supports varies depending on the materials used, it is generally from about 80 to about 1,000 $\mu$m, and from the viewpoint of ease of handling, it is preferably from about 80 to about 500 $\mu$m. These supports may have a smooth surface or a matt surface to enhance adhesion with the stimulable phosphor layer.

Further, for the purpose of enhancing adhesion to the stimulable phosphor layer, a sublayer may be applied onto the surface of said supports, onto which the stimulable phosphor layer is provided.

Examples of binders employed in said stimulable phosphor layer include proteins such as gelatin, polysaccharides such as dextran, natural polymers such as gum Arabic, and synthetic polymers such as polyvinyl butyral, polyvinyl acetate, nitrocellulose, ethylcellulose, vinylidene chloride-vinyl chloride copolymers, polyalkyl acrylate, polyalkyl methacrylate), vinyl chloride-vinyl acetate copolymers, polyurethane, cellulose acetate butyrate, polyvinyl alcohol, and linear polyesters.

Of these, most preferred are nitrocellulose, linear polyester, polyalkyl acrylate, polyalkyl methacrylate, mixtures of nitrocellulose and linear polyesters, mixtures of nitrocellulose and polyalkyl acrylate or polyalkyl methacrylate, and mixtures of polyurethane and polyvinyl butyral. Further, these binders may be subjected to cross-linking employing bridging agents. A method for forming stimulable phosphor layer will now be described.

A method for forming stimulable phosphor layer will now be described. Initially, stimulable phosphors and said binders are added to suitable solvents, and the resulting mixture is well blended, whereby a coating composition is prepared in which phosphor particles as well as said compound particles are uniformly dispersed into said binder solvents.

Further, said binders are generally employed in an amount ranging from 0.01 to 1 part by weight per part by weight of said stimulable phosphors. However, from the viewpoint of sensitivity and sharpness of the obtained radiation image conversion panel, only minimal binders are preferably employed. To facilitate ease of coating, the preferred range is from 0.03 to 0.2 part by weight per part by weight of said stimulable phosphor.

Listed as examples of solvents, employed to prepare said stimulable phosphor layer coating composition, are lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether and ethylene glycol monomethyl ether; aromatic compounds such as triol and xylol; halogenated hydrocarbons such as methylene chloride and ethylene chloride; and mixtures thereof.

Further, various additives such as dispersing agents to enhance the dispersion of said stimulable phosphors in said coating composition, and plasticizers to enhance a bonding force between binders and phosphors in the resulting stimulable phosphor layer may be incorporated into said coating composition. Listed as examples of dispersing agents employed for said purpose may be phthalic acid, stearic acid, caproic acid, and oleiophilic surface active agents. Listed as examples of plasticizers are phthalic acid esters such as triphenyl phosphate, cresyl phosphate, and diphenyl phosphate; phthalic acid esters such as dimethoxyethyl phthalate; glycolic acid esters such as ethyl phthalyl ethyl glycolate and butyl phthalyl butyl glycolate; polyesters of polyethylene glycol with aliphatic dibasic acids such as polyester of triethylene glycol with adipic acid and polyester of diethylene glycol with succinic acid.

The coating composition prepared as above is uniformly coated onto the surface of the sublayer, whereby a coating composition layer is formed. Said coating is carried out employing conventional coating means such as a doctor blade, a roll coater, and a knife coater. The resulting coating is dried through gradual heating, whereby the formation of said stimulable phosphor layer on the sublayer is completed.

Subsequently, the coated layer is dried while being gradually heated, and the formation of the stimulable phosphor layer on the sublayer is completed. The thickness of the resulting stimulable phosphor layer varies depending on the target characteristics of radiation image conversion panels, the types of stimulable phosphors, as well as the mixing ratio of binders and phosphors. However, said thickness is generally from 10 $\mu$m to 1 mm, and is preferably from 10 to 500 $\mu$m.

A stimulable phosphor layer coating composition may be prepared employing any of the common homogenizers such as a ball mill, a sand mill, an attritor, a three-pole mill, a high-speed impeller homogenizer, a Kady mill, and an ultrasonic homogenizer.

The phosphor plate, which stimulable phosphor layer is coated on the support, is cut into a predetermined size. For cutting, any of the common method may be employed. From the viewpoint of working property and accuracy, a cosmetics cutter or punch machine is preferably employed.

When the cut-phosphor plate is sealed employing a protective film, it is possible to employ any of the several conventionally known methods such as a phosphor sheet which is interposed between moisture resistant protective films and the peripheral edge of which is subjected to lamination under application of heat and pressure employing an impulse sealer, and lamination is carried out between rollers under application of heat and pressure.

Further, said heat fusion, which is carried out employing an impulse sealer, is preferably performed under reduced pressure to minimize the displacement of the phosphor sheet in the moisture resistant protective film and to remove moisture from the atmosphere.

EXAMPLES

The present invention will now be described with reference to examples. However, the present invention is not to be construed as being limited to these examples.

EXAMPLE 1

Preparation of Radiation Image Conversion Panel Sample 1

(Preparation of Phosphor Sheet)

The stimulable phosphor precursor of europium activated barium fluoride iodide was synthesized as follows. Charged into a reaction vessel were 2,780 ml of an aqueous $BaI_2$ solution (3.6 mol/liter) and 27 ml of an aqueous $EuI_3$ solution (0.2 mol/liter). While stirring, the reaction mother solution in said reaction vessel was maintained at 83° C. Subsequently, 322 ml of an aqueous ammonium fluoride solution (8 mol/liter) were poured into said mother solution employing a roller pump, whereby precipitates were formed. After the completion of pouring, the resulting precipitates underwent ripening for 2 hours while stirring and maintaining the temperature. Subsequently, the resulting precipitates were collected through filtration, washed with ethanol, and dried, whereby europium activated barium fluoride iodide crystals were obtained. In order to minimize the variation of particle size distribution due to calcination during sintering, ultra-fine alumina particle powder was added in an amount of 0.2 percent by weight, and the resulting mixture was well stirred employing a mixer so that said ultra-fine alumina particle powder was uniformly adhered onto the surface of said crystals. The resulting mixture was placed into a quartz boat which was calcined under an atmosphere of hydrogen gas at 850° C. for 2 hours in a tube furnace, whereby europium activated barium fluoride iodide phosphor particles were prepared. Subsequently said phosphor particles were classified to obtain particles having an average diameter of 7 $\mu$m.

As materials for forming a phosphor layer, 427 g of the europium activated barium fluoride iodide phosphor prepared as above, 15.8 g of a polyurethane resin (Desmolack 4125, manufactured by Sumitomo Bayer Urethane Co.), and 2.0 g of a bisphenol A type epoxy resin were added to a solvent mixture of methyl ethyl ketone and toluene (at a ratio of 1:1), and dispersed employing a propeller mixer, whereby a coating composition at a viscosity of 25 to 30 Ps.s was prepared. Said coating composition was applied onto a 100 $\mu$m thick black PET support and subsequently dried at 100° C. for 15 minutes, whereby a phosphor sheet comprising a 270 $\mu$m thick phosphor layer was prepared.

Employed as the protective film on the phosphor surface side of the phosphor sheet, prepared as above, was one having Constitution (A) described below.

Constitution (A)

VMPET12//VMPET12//PET12//sealant film wherein PET represents polyethylene terephthalate; sealant film represents a thermo-welding film such as CPP (casting polypropylene) or LLDPE (low density linear polyethylene; VMPET represents alumina-evaporated PET (being a commercially available product, manufactured by Toyo Metalizing Co.; and each numeric following the type of film described above represents the layer thickness (in μm).

Further, "//" as described above denotes a 2.5 μm thick dry lamination adhesive layer. Employed as dry lamination adhesive agents were two-liquid reaction type urethane based adhesive agents.

A blue organic colorant (Zabon First Blue 3G, manufactured by Hoechst Co.), which had been dispersed into methyl ethyl ketone, was added to the employed adhesive agent solution, whereby resulting all adhesive agent layers were employed as stimulating light absorbing layers. At the same time, the light transmittance for the stimulating light of Protective Film was adjusted by varying the added amount of the adhesive agent solution.

Further, the light transmittance for stimulating light of the Protective Film, as described herein, refers to the value obtained by comparing the light transmittance at the wavelength (633 nm) of an He—Ne laser beam to the similar protective film without the stimulating light absorbing layer.

Employed as the protective film on the support surface side of the phosphor sheet was a dry laminate film comprised of a sealant film/a 9 μm thick aluminum foil film/a 188 μm thick polyethylene terephthalate (PET) film. In this case, the thickness of the adhesive agent layer was 1.5 μm, and a 2-liquid reactive type urethane adhesive agent was employed.

(Sealing of the Phosphor Sheet)

A coating sample was cut into 20×20 cm square sheets, and by fusing each of said protective films having various types of haze and stimulating light absorbing layers, the peripheral edges were sealed under reduced pressure employing an impulse sealer. FIG. 1 is a cross-sectional view of the radiation image conversion panel of the present invention. Incidentally, fusing was carried out so that the distance between the welded area and the peripheral edge of said phosphor sheet was 1 mm. The width of the heater of the impulse sealer employed for fusing was 8 mm.

Radiation Image Conversion Panel Sample 1 was prepared as above. Further, Radiation Image Conversion Panel Samples 2 through 11 were prepared in the same manner as Radiation Image Conversion Panel Sample 1, except that the haze ratio was adjusted as shown in Table 1.

Obtained Radiation Image Conversion Panel Samples 1 through 11 were subjected to the evaluation described below.

Evaluation of Radiation Image Conversion Panel (Evaluation of Sharpness)

Each of the radiation image conversion panels was exposed with X-rays at a tube voltage of 80 kVp through an MTF chart made of lead. Thereafter, the exposed panel was stimulated utilizing an He—Ne laser beam. Stimulated luminescence radiated from the phosphor layer was received employing the same light receiving device as above and converted to electric signals, which were subjected to analog/digital conversion. Converted signals were recorded on a hard disk, and the modulation transfer function (MTF) of recorded X-ray image recorded on said hard disk was examined while being analyzed, utilizing a computer. MTF values (in percent) at a space frequency of 1 cycle/mm were determined. The MTF value is preferably as high as possible, because thereby it is possible to obtain excellent sharpness. Further, it is necessary that in order to make the image conversion panel commercially viable, sharpness exceeds 65 percent.

(Evaluation of Image Unevenness and Linear Noise)

Each of the radiation image conversion panels was exposed to X-rays at a tube voltage of 80 kVp, and subsequently was stimulated, upon being scanned utilizing an He—Ne laser beam (having a wavelength of 633 nm). Stimulated luminescence radiated from the phosphor layer was received employing a light receiving device (a photomultiplier with spectral sensitivity S-5) and converted to electric signals. Subsequently, said electric signals were reproduced into images, utilizing an image reproduction device. Each of the reproduced images was printed while being enlarged at a factor of 2, employing an output device. Each of the resulting print images was visually inspected and image unevenness as well as linear noise was evaluated. Said image unevenness as well as said linear noise was subjected to a 6-ranking evaluation of 0 through 5 as described below.

0: neither image unevenness nor linear noise was noticed

1: slight image unevenness and linear noise were noticed in 1 to 2 areas within the plane 2: slight image unevenness and linear noise were noticed in 3 to 4 areas within the plane, 3: image unevenness and linear noise were noticed in 3 to 4 areas within the plane and marked image unevenness and linear noise were noticed in 1 to 2 areas among them 4: image unevenness and linear noise were noticed in at least 5 areas within the plane 5: marked image unevenness and linear noise were noticed in at least 5 areas within the plane.

(Evaluation of Luminance)

Each of said radiation image conversion panels was exposed to X-rays at a tube voltage of 80 kVp, and subsequently was stimulated, utilizing an He—Ne laser beam (having a wavelength of 633 nm). The intensity of photoluminescence radiated from the phosphor layer was determined employing a light receiving device (a photomultiplier). The results showed that all samples exhibited commercially viable luminance.

Table 1 shows the obtained results.

TABLE 1

| Panel | Remarks | Stimulating Light Absorbing Layer | Light Transmittance (in %) | Haze Ratio (in %) | MTF (in %) | Image Unevenness 0 to 5 |
|---|---|---|---|---|---|---|
| 1 | Comparative Example | none | 100 | 3 | 68 | 4 |
| 2 | Comparative Example | none | 100 | 40 | 65 | 2 |
| 3 | Comparative Example | present | 95 | 3 | 76 | 5 |
| 4 | Present Invention | present | 95 | 5 | 76 | 3 |
| 5 | Present Invention | present | 95 | 20 | 76 | 0 |

TABLE 1-continued

| Panel | Remarks | Stimulating Light Absorbing Layer | Light Transmittance (in %) | Haze Ratio (in %) | MTF (in %) | Image Unevenness 0 to 5 |
|---|---|---|---|---|---|---|
| 6 | Present Invention | present | 95 | 40 | 73 | 0 |
| 7 | Present Invention | present | 95 | 50 | 72 | 0 |
| 8 | Comparative Example | present | 95 | 72 | 60 | 0 |
| 9 | Present Invention | present | 80 | 40 | 75 | 0 |
| 10 | Present Invention | present | 60 | 40 | 77 | 0 |
| 11 | Present Invention | present | 40 | 40 | 78 | 0 |

As can be seen from Table 1, compared to comparative samples, samples of the present invention exhibit excellent sharpness, minimizes image unevenness as well as linear noise, and exhibits sufficient luminance for practical use.

EXAMPLE 2

Preparation of Radiation Image Conversion Panel Sample 2-3

(Preparation of Phosphor Sheet)

The stimulable phosphor precursor of europium activated barium fluoride iodide was synthesized as follows. Charged into a reaction vessel were 2,780 ml of an aqueous $BaI_2$ solution (3.6 mol/liter) and 27 ml of an aqueous $EuI_3$ solution (0.2 mol/liter). While stirring, the reaction mother solution in said reaction vessel was maintained at 83° C. Subsequently, 322 ml of an aqueous ammonium fluoride solution (8 mol/liter) were poured into said mother solution employing a roller pump, whereby precipitates were formed. After the completion of pouring, the resulting precipitates underwent ripening for 2 hours while stirring and maintaining the temperature. Subsequently, the resulting precipitates were collected through filtration, washed with ethanol, and dried, whereby europium activated barium fluoride iodide crystals were obtained. In order to minimize the variation of particle size distribution due to calcination during sintering, ultra-fine alumina particle powder was added in an amount of 0.2 percent by weight, and the resulting mixture was well stirred employing a mixer so that said ultra-fine alumina particle powder was uniformly adhered onto the surface of said crystals. The resulting mixture was filled in a quartz boat which was calcined under an atmosphere of hydrogen gas at 850° C. for 2 hours in a tube furnace, whereby europium activated barium fluoride iodide phosphor particles were prepared. Subsequently said phosphor particles were classified to obtain particles having an average diameter of 7 μm.

As materials for forming a phosphor layer, 427 g of the europium activated barium fluoride iodide phosphor prepared as above, 15.8 g of a polyurethane resin (Desmolack 4125, manufactured by Sumitomo Bayer Urethane Co.), and 2.0 g of a bisphenol A type epoxy resin were added to a solvent mixture of methyl ethyl ketone and toluene (at a ratio of 1:1), dispersed employing a propeller mixer, whereby a coating composition at a viscosity of 25 to 30 Ps.s was prepared. Said coating composition was applied onto a 100 μm thick black PET support and subsequently dried at 100° C. for 15 minutes, whereby a phosphor sheet comprising a 270 μm thick phosphor layer was prepared.

(Preparation of the Moisture Resistant Protective Film)

Employed as the protective film on the phosphor surface side of the phosphor sheet, prepared as above, was one having Constitution (A) described below.

Constitution (A)

VMPET12//VMPET12//PET12//sealant film wherein PET represents polyethylene terephthalate; sealant film represents a thermo-welding film such as CPP (casting polypropylene) or LLDPE (low density linear polyethylene; VMPET represents alumina-evaporated PET (being a commercially available product, manufactured by Toyo Metalizing Co.; and each numeric following the type of film represents the layer thickness (in μm).

Further, "//" as described above denotes a 2.5 μm thick dry lamination adhesive layer. Employed as dry lamination adhesive agents were two-liquid reaction type urethane based adhesive agents.

A blue organic colorant (Zabon First Blue 3G, manufactured by Hoechst Co.), which had been dispersed into methyl ethyl ketone, was added to the employed adhesive agent solution, whereby resulting all adhesive agent layers were employed as stimulating light absorbing layers. At the same time, the light transmittance for the stimulating light of Protective Film was adjusted by varying the added amount of the adhesive agent solution.

Further, the light transmittance for stimulating light of the Protective Film, as described herein, refers to the value obtained by comparing the light transmittance at the wavelength (633 nm) of an He—Ne laser beam to the similar protective film without the stimulating light absorbing layer.

Employed as the protective film on the support surface side of the phosphor sheet was a dry laminate film comprised of a sealant film/a 9 μm thick aluminum foil film/a 188 μm thick polyethylene terephthalate (PET). In this case, the thickness of the adhesive agent layer was 1.5 μm, and a 2-liquid reactive type urethane adhesive agent was employed.

(Sealing of the Phosphor Sheet)

A coating sample was cut into 45×45 cm square sheets, and by fusing each of the said protective films having various types of haze and stimulating light absorbing layers, the peripheral edges were sealed under reduced pressure, employing an impulse sealer. FIG. 1 is a cross-sectional view of the radiation image conversion panel of the present invention. Incidentally, fusing was carried out so that the distance between the welded area and the peripheral edge of said phosphor sheet was 1 mm. The width of the heater of the impulse sealer employed for fusing was 8 mm.

Radiation Image Conversion Panel Sample 2-3 was prepared as above. Each of Radiation Image Conversion Panel Samples 2-1 and 2-2, and 2-4 through 2-7 was prepared in the same manners as Radiation Image Conversion Panel Sample 2-3, except that the surface roughness Ra was adjusted to the values shown in Table 1. Further, all samples were adjusted so as to exhibit a haze ratio of 5 to 60 percent.

Obtained Radiation Image Conversion Panel Samples 2-1 through 2-7 were subjected to the evaluation described below.

Evaluation of Radiation Image Conversion Panel (Evaluation of Sharpness)

Each of said radiation image conversion panels was exposed to X-rays at a tube voltage of 80 kVp through an MTF chart made of lead. Thereafter, the exposed panel was subjected to scanning, utilizing an He—Ne laser beam, so as to be stimulated. Stimulated luminescence radiated from the phosphor layer was received employing the same light receiving device as above and converted to electric signals, which were subjected to analog/digital conversion. Converted signals were recorded on a hard disk, and the modulation transfer function (MTF) of recorded X-ray image recorded on said hard disk was examined, while being analyzed utilizing a computer.

Modulation Transfer Function (MTF) was determined at 10 points within the plane of each radiation image conversion panels in said size of 45×45 cm and the distribution of the MTF values was examined. Subsequently, the maximum value, the minimum value in the 10 points, as well as the average were recorded.

Table 2 shows MTF values (in percent) at a space frequency of 1 cycle/mm. In this case, the greater the MTF value, the better sharpness results. Table 1 also shows the average of MTF values (in percent) at a space frequency of 1 cycle/mm within the plane of each radiation image conversion panel. In this case, the greater the MTF value, the better sharpness results. In order to use the radiation image conversion panel in practice, it is required that the sharpness exceeds 65 percent.

Furthermore, Table 2 shows the difference between the maximum and minimum MTF values (in percent) within the plane of each radiation image conversion panel. The smaller the difference, the better the uniformity results within the plane.

(Evaluation of Luminance)

Each of said radiation image conversion panels was exposed to X-rays at a tube voltage of 80 kVp, and subsequently was stimulated, utilizing an He—Ne laser beam (having a wavelength of 633 nm). The intensity of stimulated luminescence radiated from the phosphor layer was determined employing a light receiving device (a photomultiplier having spectral sensitivity S-5). The results showed that all samples exhibited commercially viable luminance.

Table 2 shows the obtained results.

TABLE 2

| Panel | Stimulating Light Absorbing Layer | Light Transmittance (in %) | Phosphor Surface Roughness Ra (in μm) | Protective Layer Roughness Ra | MTF Average (in %) | MTF Difference Maximum - Minimum | Remarks |
|---|---|---|---|---|---|---|---|
| 2-1 | none | 100 | 0.20 | 0.15 | 67 | 6 | Comparative Example |
| 2-2 | none | 100 | 0.52 | 0.46 | 62 | 5 | Comparative Example |
| 2-3 | present | 95 | 0.20 | 0.15 | 74 | 5 | Present Example |
| 2-4 | present | 95 | 0.20 | 0.46 | 74 | 2 | Present Example |
| 2-5 | present | 95 | 0.20 | 0.56 | 74 | 2 | Present Example |
| 2-6 | present | 60 | 0.20 | 0.56 | 77 | 1 | Present Example |
| 2-7 | present | 40 | 0.20 | 0.56 | 78 | 1 | Present Example |

Based on Table 2, it was noted that compared to the comparative examples, the samples of the present invention exhibited excellent sharpness, as well as excellent uniformity within the panel plane, and resulted in a commercially viable magnitude of luminance.

EXAMPLE 3

Preparation of Radiation Image Conversion Panel Sample 3-6

(Preparation of a Phosphor Sheet)

The stimulable phosphor precursor of europium activated barium fluoride iodide was synthesized as follows. Charged into a reaction vessel were 2,780 ml of an aqueous $BaI_2$ solution (3.6 mol/liter) and 27 ml of an aqueous $EuI_3$ solution (0.2 mol/liter). While stirring, the reaction mother solution in said reaction vessel was maintained at 83° C. Subsequently, 322 ml of an aqueous ammonium fluoride solution (8 mol/liter) were poured into said mother solution employing a roller pump, whereby precipitates were formed. After the completion of pouring, the resulting precipitates underwent ripening for 2 hours while stirring and maintaining the temperature. Subsequently, the resulting precipitates were collected through filtration, washed with ethanol, and dried, whereby europium activated barium fluoride iodide crystals were obtained. In order to minimize the variation of particle size distribution due to calcination during sintering, ultra-fine alumina particle powder was added in an amount of 0.2 percent by weight, and the resulting mixture was well stirred employing a mixer so that said ultra-fine alumina particle powder was uniformly adhered onto the surface of said crystals. The resulting mixture was filled in a quartz boat which was calcined under an atmosphere of hydrogen gas at 850° C. for 2 hours in a tube furnace, whereby europium activated barium fluoride iodide phosphor particles were prepared. Subsequently said phosphor particles were classified to obtain particles having an average diameter of 7 μm.

As materials for forming a phosphor layer, 427 g of the europium activated barium fluoride iodide phosphor prepared as above, 15.8 g of a polyurethane resin (Desmolack 4125, manufactured by Sumitomo Bayer Urethane Co.), and 2.0 g of a bisphenol A type epoxy resin were added to a solvent mixture of methyl ethyl ketone and toluene (at a ratio of 1:1), dispersed employing a propeller mixer, whereby a coating composition at a viscosity of 25 to 30 Ps.s was prepared. Said coating composition was applied onto a 100 μm thick black PET support and subsequently dried at 100° C. for 15 minutes, whereby a phosphor sheet comprising a 270 μm thick phosphor layer was prepared.

(Preparation of Protective Film)

Employed as the protective film on the phosphor surface side of the phosphor sheet, prepared as above, was one having Constitution (A), described below.

Constitution (A)

VMPET12//VMPET12//PET12//sealant film wherein PET represents polyethylene terephthalate; the sealant film represents a thermo-welding film such as CPP (casting polypropylene) or LLDPE (low density linear polyethylene; VMPET represents alumina-evaporated PET (being a commercially available product, manufactured by Toyo Metalizing Co.; and each numeric following the type of film represents the layer thickness (in μm).

Further, "//" as described above denotes a 2.5 μm thick dry lamination adhesive layer. Employed as dry lamination adhesive agents were two-liquid reaction type urethane based adhesive agents.

A blue organic colorant (Zabon First Blue 3G, manufactured by Hoechst Co.), which had been dispersed into methyl ethyl ketone, was added to the employed adhesive agent solution, whereby resulting all adhesive agent layers were employed as stimulating light absorbing layers. At the same time, the light transmittance for the stimulating light of Protective Film was adjusted by varying the added amount of the adhesive agent solution.

The light transmittance for the stimulating light of the Protective Film, as described herein, refers to the value obtained by comparing the light transmittance at the wavelength (690 nm) of a semiconductor laser beam, to the similar protective film without the stimulating light absorbing layer.

Employed as the protective film on the support surface side of the phosphor sheet was a dry laminate film comprised of a sealant film/a 9 μm thick aluminum foil film/a 188 μm thick polyethylene terephthalate (PET) film. In this case, a 1.5 μm thickness adhesive agent layer was employed, and a 2-liquid reactive type urethane adhesive agent was also employed.

(Sealing of Phosphor Sheet)

A coating sample was cut into 20×20 cm square sheets. Subsequently, two each of the cut sheets of protective films having the various types of haze and the stimulating light absorbing layers as above, were sealed as follows. The upper and lower edges of the four peripheral sides of said sheets were welded under a reduced pressure employing an impulse sealer. FIG. 1 is a cross-sectional view of the radiation image conversion panel constituted in such a manner that four sides are sealed by fusing the upper and lower peripheral edges of the protective films. FIG. 1 does not show the other two sides. Incidentally, fusing was carried out so that the distance between the welded area and the peripheral edge of said phosphor sheet was 1 mm. The width of the heater of the impulse sealer employed for fusing was 8 mm.

Radiation Image Conversion Panel Sample 3-6 was prepared as above. Radiation Image Conversion Panel Samples 3-7 through 3-9, as well as Comparative Radiation Image Comparative Conversion Panel Sample C-2 were prepared in the same manner as Radiation Image Conversion Panel Sample 3-6, except that the light transmittance of the protective layer, as well as the light transmittance of the support was adjusted to the values shown in Table 3.

Subsequently, Radiation Image Conversion Panel Samples 3-1 through 3-5, as well as Comparative Radiation Image Conversion Panel Sample C-1 were prepared in the same manner as Radiation Image Conversion Panel Sample 3-6, except that the phosphor sheet was sealed employing the folded-back structure as shown in FIG. 2, and the light transmittance of the protective layer, as well as of the support was adjusted to the values shown in Table 3.

Further, each of Radiation Image Conversion Panel Samples 10 through 12, as well as Comparative Radiation Image Conversion Panel C-3 were prepared in the same manner as Radiation Image Conversion Panel 3-6, except that PET films (at a thickness of approximately 12 μm) were stacked on each other so that the adhesive agent came into contact with the phosphor layer surface, and heat-pressed employing a heat roll at 80 to 100° C. to result in a non-sealing structure, and the light transmittance of the protective film as well as of the support was adjusted to the values shown in Table 3. Further, all samples was adjusted to achieve a haze ratio of 5 to 60 percent.

Obtained Radiation Image Conversion Panel Samples were subjected to the evaluation described below.

Evaluation of Radiation Image Conversion Panel (Evaluation of Sharpness)

Each of said radiation image conversion panels was exposed to X-rays at a tube voltage of 80 kVp through an MTF chart made of lead. Thereafter, the exposed panel was subjected to scanning, utilizing a semiconductor laser beam (690 nm), so as to be stimulated. Stimulated luminescence radiated from the phosphor layer was received employing the same light receiving device as above and converted to electric signals, which was subjected to analog/digital conversion. Converted signals were recorded on a hard disk, and the modulation transfer function (MTF) of recorded X-ray image recorded on said hard disk was examined while being analyzed utilizing a computer. The MTF value (in percent) at a space frequency of 1 cycle/mm was determined. The greater the MTF value, the better sharpness results. Further, in order to use the radiation image conversion panel in practice, the sharpness preferably exceeds 65 percent.

Contrast Evaluation

The prepared radiation image conversion panel was uniformly exposed to X-rays at a tube voltage of 80 kVp so as to image a 2 mm thick lead disk. Subsequently, the exposed panel was subjected to scanning, utilizing a semiconductor laser beam (690 nm), so as to be stimulated. Stimulated luminescence radiated from the phosphor layer was received employing the same light receiving device (being a photomultiplier tube having spectral sensitivity S-5). The resulting image was read. Further, the resulting image was outputted employing a laser writing type film printer. The degree of black-and white contrast resulting in the lead disk area and its peripheral area was visually evaluated based on the 5-grade criteria described below. Grade 3 or lower were evaluated as being commercially unviable.

5: the lead disk peripheral area and the lightness difference of black and white were clearly noticed 4: the lead disk peripheral area resulted in slight blurring, but lightness difference of black and white was clearly noticed 3: the lead disk peripheral area results in blurring and the lightness difference of black and white was not very clear 2: the lead disk peripheral area, as well as the lightness difference of black and white, was not clear, and the lead disk size was not reproduced 1: the lead disk shape as well as the lightness difference of black and white was not clear and the whiteness of the central area was degraded.

Table 3 shows the obtained results.

TABLE 3

| Sample No. | Shape of Protective Film | Light Transmittance of Protective Film on the Phosphor Side (in %) (690 nm) | Light Transmittance of Protective Film on the Support Side (in %) (690 nm) | Light Transmittance of Folded-Back Portion (in %) (690 nm) | Light Transmittance of Support (in %) (400 nm) | (690 nm) | Evaluation Item Image Contrast | MTF | Remarks |
|---|---|---|---|---|---|---|---|---|---|
| 3-1 | Folded-Back (3-side sealing) | 91 | 91 | 91 | 0 | 0 | 4 | 68 | Inv. |

TABLE 3-continued

| Sample No. | Shape of Protective Film | Light Transmittance of Protective Film on the Phosphor Side (in %) (690 nm) | Light Transmittance of Protective Film on the Support Side (in %) (690 nm) | Light Transmittance of Folded-Back Portion (in %) (690 nm) | Light Transmittance of Support (in %) (400 nm) | Light Transmittance of Support (in %) (690 nm) | Evaluation Item Image Contrast | Evaluation Item MTF | Remarks |
|---|---|---|---|---|---|---|---|---|---|
| 3-2 | Folded-Back (3-side sealing) | 91 | 91 | 70 | 0 | 0 | 4 | 72 | Inv. |
| 3-3 | Folded-Back (3-side sealing) | 70 | 70 | 42 | 0 | 0 | 5 | 72 | Inv. |
| 3-4 | Folded-Back (3-side sealing) | 91 | 91 | 27 | 92 | 12 | 4 | 70 | Inv. |
| 3-5 | Folded-Back (3-side sealing) | 91 | 42 | 91 | 92 | 27 | 4 | 72 | Inv. |
| 3-6 | Upper and Lower Edge Fused (4-side sealing) | 91 | 91 | — | 0 | 0 | 4 | 68 | Inv. |
| 3-7 | Upper and Lower Edge Fused (4-side sealing) | 70 | 70 | — | 92 | 27 | 4 | 70 | Inv. |
| 3-8 | Upper and Lower Edge Fused (4-side sealing) | 91 | 42 | — | 0 | 0 | 4 | 70 | Inv. |
| 3-9 | Upper and Lower Edge Fused (4-side sealing) | 70 | 42 | — | 0 | 0 | 4 | 75 | Inv. |
| 3-10 | Independent Upper and Lower (non-sealing structure) | 91 | 12 | — | 92 | 85 | 4 | 70 | Inv. |
| 3-11 | Independent Upper and Lower (non-sealing structure) | 91 | 91 | — | 92 | 12 | 4 | 70 | Inv. |
| 3-12 | Independent Upper and Lower (non-sealing structure) | 91 | 42 | — | 92 | 27 | 4 | 72 | Inv. |
| C-1 | Folded-Back (3-side sealing) | 100 | 100 | 100 | 100 | 100 | 2 | 60 | Comp. |
| C-2 | Upper and Lower Edge Fused (4-side sealing) | 100 | 0 | — | 100 | 100 | 2 | 50 | Comp. |
| C-3 | Independent Upper and Lower (non-sealing structure) | 100 | 100 | — | 100 | 100 | 2 | 40 | Comp. |

Inv.: Present Invention, Comp.: Comparative

As can be seen from Table 1, compared to the comparative examples, the samples of the present invention exhibit excellent sharpness and produce higher contrast images.

EFFECTS OF THE INVENTION

The present invention makes it possible to provide a stimulable phosphor-employing radiation image conversion panel which results in no image unevenness and yet exhibits excellent sharpness.

What is claimed is:

1. A radiation image conversion panel comprising:

a phosphor sheet having a support and a stimulable phosphor layer on the support the stimulable phosphor layer containing a stimulable phosphor; and a protective film covering the stimulable phosphor layer, wherein a transmittance of the protective film for stimulating light to stimulate the stimulable phosphor is not larger than 97%, a haze ratio of the protective film is stimulable the range of 5% to 60%, and a water vapor transmission rate of the protective film is not more than 10 g/$m^2$ per day.

2. The radiation image conversion panel of claim 1, wherein the transmittance of the protective film for stimulating light is within a range of from 97 to 50 percent.

3. The radiation image conversion panel of claim 2, wherein the transmittance of the protective film for stimulating light is within a range of from 97 to 80 percent.

4. The radiation image conversion panel of claim 1, wherein the haze ratio is within the range of 5% to 50%.

5. The radiation image conversion panel of claim 4, wherein the haze ratio is within the range of 10% to 30%.

6. A radiation image conversion panel comprising:

a phosphor sheet having a support and a stimulable phosphor layer on the support, the stimulable phosphor layer containing a stimulable phosphor; and a protective film covering the stimulable phosphor layer, wherein a transmittance of the protective film for stimulating light to stimulate the stimulable phosphor is not larger than 97%, a haze ratio of the protective film is within the range of 5% to 60%, and wherein the protective film includes a first resin layer, a second resin layer and stimulating light absorbing layer between the first resin layer and the second resin layer.

7. The radiation image conversion panel of claim 6, wherein the transmittance of the protective film stimulating light is within a range of from 97 to 50 percent.

8. The radiation image conversion panel of claim 7, wherein the transmittance of the protective film for stimulating light is within a range of from 97 to 80 percent.

9. The radiation image conversion panel of claim 6, wherein the haze ratio is within the range of 5% to 50%.

10. The radiation image conversion panel of claim 9, wherein the haze ratio within the range of 10% to 30%.

11. A radiation image conversion panel comprising:

a phosphor sheet having a support and a stimulable phosphor layer on the support, the stimulable phosphor layer containing a stimulable phosphor; and a protective film covering the stimulable phosphor layer, wherein a transmittance of the protective film for stimulating light to stimulate the stimulable phosphor is not larger than 97%, a haze ratio of the protective film is within the range of 5% to 60%, and wherein the protective film is provided independently from the stimulable phosphor layer so as to cover the whole surface of the phosphor sheet and the protective film has art outermost layer, which is in contact with the phosphor sheet, and a surface roughness, which is an arithmetical mean roughness (Ra) defined by JIS-B0601, of the outermost layer is larger than a surface roughness of the stimulable phosphor layer.

12. The radiation image conversion panel of claim 11, wherein the surface roughness of the outermost layer of the protective film is not more than 1.0 μm.

13. The radiation image conversion panel of claim 11, wherein a water vapor transmission rate of the protective film is not more than 50 $g/m^2$ per day.

14. The radiation image conversion panel of claim 13, wherein the water vapor transmission rate of the protective film is not more than 10 $g/m^2$ per day.

15. The radiation image conversion panel of claim 11, wherein the outermost layer of the protective film comprises a thermo-welding resin on its surface which is in contact with the phosphor sheet.

16. The radiation image conversion panel of claim 11, wherein the transmittance of the protective film for stimulating light is within a range of from 97 to 50 percent.

17. The radiation image conversion panel of claim 16, wherein the transmittance of protective film stimulating light is within a range of from 97 to 80 percent.

18. The radiation image conversion panel of claim 11, wherein the haze ratio is within the range of 5% to 50%.

19. The radiation image conversion panel of claim 18, wherein the haze ratio within the range of 10% to 30%.

* * * * *